(12) United States Patent
Hillesheim et al.

(10) Patent No.: US 8,397,758 B2
(45) Date of Patent: Mar. 19, 2013

(54) VALVE

(75) Inventors: Thorsten Hillesheim, Reichshof-Schemmerhausen (DE); Peter Bruck, Althornbach (DE)

(73) Assignee: Hydac Fluidtechnik GmbH, Sulzbach/Saar (DE)

( * ) Notice: Subject to any disclaimer, the term of this patent is extended or adjusted under 35 U.S.C. 154(b) by 1669 days.

(21) Appl. No.: 10/557,985

(22) PCT Filed: Apr. 15, 2004

(86) PCT No.: PCT/EP2004/003936
§ 371 (c)(1),
(2), (4) Date: Sep. 6, 2006

(87) PCT Pub. No.: WO2004/109419
PCT Pub. Date: Dec. 16, 2004

(65) Prior Publication Data
US 2007/0169826 A1     Jul. 26, 2007

(30) Foreign Application Priority Data

Jun. 4, 2003 (DE) .................................. 103 25 177

(51) Int. Cl.
*F16K 11/07* (2006.01)
(52) U.S. Cl. .............................. 137/625.68; 137/625.64
(58) Field of Classification Search ............ 137/625.64, 137/625.65, 625.68, 468; 239/397.5; 251/30.01–30.05, 118
See application file for complete search history.

(56) References Cited

U.S. PATENT DOCUMENTS

| | | | |
|---|---|---|---|
| 3,183,932 A * | 5/1965 | Karpus, Jr. ............... | 137/614.19 |
| 3,472,274 A * | 10/1969 | Fettke .......................... | 137/469 |
| 3,856,047 A | 12/1974 | Takayama | |
| 4,313,468 A * | 2/1982 | Patel ......................... | 137/625.64 |
| 4,491,153 A | 1/1985 | Bartholomaus | |
| 4,548,233 A * | 10/1985 | Wolfges ........................ | 137/529 |

(Continued)

FOREIGN PATENT DOCUMENTS

| DE | 44 17 293 A1 | 11/1995 |
|---|---|---|
| DE | 195 04 886 C2 | 8/1996 |

(Continued)

*Primary Examiner* — Craig Schneider
*Assistant Examiner* — Craig J Price
(74) *Attorney, Agent, or Firm* — Roylance, Abrams, Berdo & Goodman L.L.P.

(57) ABSTRACT

A valve, particularly a proportional pressure control valve for controlling fluid flows, includes a valve housing (10) having at least three fluid-conducting connections in the form of a pump connection (P), a use connection (A) and of a tank (T) connection. To connect the pump connection (T) to the use connection (A) and the use connection (A) to the tank connection (T), a control piston (18) can be guided in a longitudinally displaceable manner inside the valve housing (10). This control piston is provided for establishing a fluid-conducting connection between at least one of the connections (P) and a pilot chamber (20) of a pilot valve (22) having a connecting channel (24). A valve part (40) of the pilot valve (22) is guided in the pilot chamber (20) in a longitudinally displaceable manner. The connecting channel (24) has a throttle in the direction of the pilot chamber (20) of the pilot valve (22) with its valve part. A guiding device (38) oriented toward the pilot chamber (20) and provided for guiding the fluid flow is provided next to the throttle to divert the fluid flow, conveyed inside the connecting channel (24) and flowing toward the valve part (40), at least partially away from this valve part.

11 Claims, 2 Drawing Sheets

U.S. PATENT DOCUMENTS

| | | | |
|---|---|---|---|
| 4,572,436 A * | 2/1986 | Stettner et al. | 239/124 |
| 4,576,200 A | 3/1986 | Janecke | |
| 4,579,145 A * | 4/1986 | Leiber et al. | 137/625.65 |
| 4,705,219 A * | 11/1987 | Pagdin | 239/397.5 |
| 4,741,364 A * | 5/1988 | Stoss et al. | 137/625.64 |
| 5,062,454 A * | 11/1991 | Ichihashi et al. | 137/625.64 |
| 5,381,823 A * | 1/1995 | DiBartolo | 137/494 |
| 5,836,335 A * | 11/1998 | Harms et al. | 137/625.64 |
| 6,269,827 B1 * | 8/2001 | Potter | 137/625.65 |
| 6,286,535 B1 | 9/2001 | Harms | |
| 6,289,921 B1 * | 9/2001 | Neuhaus et al. | 137/625.65 |
| 6,364,430 B1 * | 4/2002 | Park | 251/129.02 |
| 6,779,558 B1 * | 8/2004 | Bruck et al. | 137/625.65 |
| 7,073,533 B2 * | 7/2006 | Bruck et al. | 137/625.68 |

FOREIGN PATENT DOCUMENTS

| | | |
|---|---|---|
| EP | 0 233 166 A2 | 8/1987 |
| EP | 0 701 188 A1 | 3/1996 |

* cited by examiner

VALVE

FIELD OF THE INVENTION

The present invention relates to a valve, especially a proportional pressure control valve for controlling fluid flows. The valve has a valve housing with at least three fluid-carrying ports, in the form of a pump port P, a use port A and a tank port T. Within the valve housing for optional connection of the pump port P to the use port A, and of the use port A to the tank port T, a control piston is guided movably in the longitudinal direction. The control piston is provided with a connecting channel for producing a fluid-carrying connection between at least one of the ports and the pilot chamber of the pilot valve. The valve part of the pilot valve is guided movably in the longitudinal direction in the pilot chamber. The connecting channel has a throttle in the direction of the pilot chamber of the pilot valve with its valve part.

BACKGROUND OF THE INVENTION

A generic valve of this type in the form of a proportional pressure control valve is disclosed in U.S. Pat. No. 6,286,535 B1. In this known solution, the pump port P in the axial displacement direction of the control piston within the valve housing discharges into the housing. The other two ports in the form of the use port A and the tank port T discharge transversely to the axial direction in the radial direction. The corresponding displacement position of the control piston is into an annulus which on one side adjoins the valve housing and on the other side adjoins the control piston itself. A damping orifice in the control piston permanently connects a damping chamber between the valve housing and the control piston to the annulus. In this way, the transient processes of the control piston can be damped as required with still simultaneously high dynamics for the overall valve. This dampening is necessary when these proportional pressure control valves are used preferably in clutch systems which are used, for example, to connect two shafts, particularly the shafts of machines with transmission shafts.

In the known solution, the connecting channel in the direction of the pilot chamber of the pilot valve with its valve part within the control piston has a throttle. The throttle, on its side facing away from the pilot chamber, is provided with a filter part for filtering out dirt in the fluid stream which otherwise could clog the throttle and could block it in this way. The fluid stream throttled in this way travels with high pressure to a spherical closing or valve part of the pilot valve which can be actuated by a conventional magnetic system, especially a proportional magnetic system. In the process, the fluid stream is routed unbraked after passing through the throttle in the extension of the connecting channel to the spherical valve part. This valve part is spring-loaded against the action of the magnetic system in its closed position along the valve seat of the pilot chamber. The fluid stream routed in this way directly to the valve part applies very high jet forces to the closing element designed to this end to be spherical. This arrangement leads to neutral dynamic effects on the pilot control, and in certain valve states malfunctions are possible. Especially when these valves are being used for hydraulically actuated clutches or the like subject to increased requirements in terms of safety engineering, these malfunctions cannot be tolerated.

In a further development this known generic solution, proportional pressure control valves according to U.S. Pat. No. 5,836,335 are known in which the control piston has a means for limiting pressure spikes, as could easily occur, for example, on the use port A to which hydraulic clutches can be connected. For this purpose, in one preferred embodiment of the known valve, a spring-loaded return valve is inserted into the control piston and clears the fluid-carrying path at a definable pressure threshold value between the annulus and a containing groove permanently connected to the tank port.

SUMMARY OF THE INVENTION

An object of the present invention is to an improved valve ensuring that malfunctions, especially relative to the pilot valve, cannot occur and meeting high safety requirements for appropriate actuation to be able to use this valve especially in hydraulic clutch systems.

This object is basically achieved by a valve, especially a proportional pressure control valve, where, in addition to the throttle, a guide is oriented in the direction of the pilot chamber for the fluid stream. The fluid stream guided in the connecting channel is then deflected at least partly in the direction of the valve part by the guide. The fluid stream directed at the valve part of the pilot valve can be deflected and/or can be atomized such that the jet forces no longer directly strike the closing element of the pilot control. Neutral dynamic effects on the pilot control can then be avoided and malfunctions can be reliably precluded in any valve state.

In one preferred embodiment of the valve of the present invention, the throttle is designed as an orifice. The guide means has at least one atomizer part and/or deflector part. Preferably, the atomizer part is formed from individual atomizer nozzles, and the deflection part is formed from at least one deflection channel assuming a definable oblique position relative to the connecting channel. The fluid stream supplied by the connecting channel and the orifice can be extremely finely dispersed in the direction of the valve part of the pilot valve by the atomizer nozzles, so that the indicated jet forces on the valve part are appreciably reduced. Additionally or as an alternative, a fluid-carrying deflection channel in the oblique position can route the fluid stream as a helical guide in the direction of the pilot chamber, so that in this way the jet forces only come into indirect contact with the valve part of the pilot valve.

In another preferred embodiment of the valve of the present invention, the throttle, especially in the form of an orifice, and the guide are two components which separately from one another can be fixed in the connecting channel. The guide for fluid jet guidance can be replaced by another guide to be able to optimally adapt the valve to different pump pressure ranges (primary pressures). Preferably, the guide, in particular with the respective atomizer part and/or the respective deflection part is provided with another throttle, especially in the form of another orifice. The guide then forms a diffusion orifice. The diffusor portion can be regarded in mathematical terms as a part of the flow channel with a flow cross section gradually widening so that the flow taking place from the narrow cross section to the wide cross section undergoes a reduction in speed with a simultaneous pressure rise, i.e., the jet speed is converted into pressure. The indicated atomization or jet guidance does not lead to damaging pressure jets on the valve part itself, but rather significantly improves only the inflow conditions in the area of the pilot chamber of the pilot valve.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
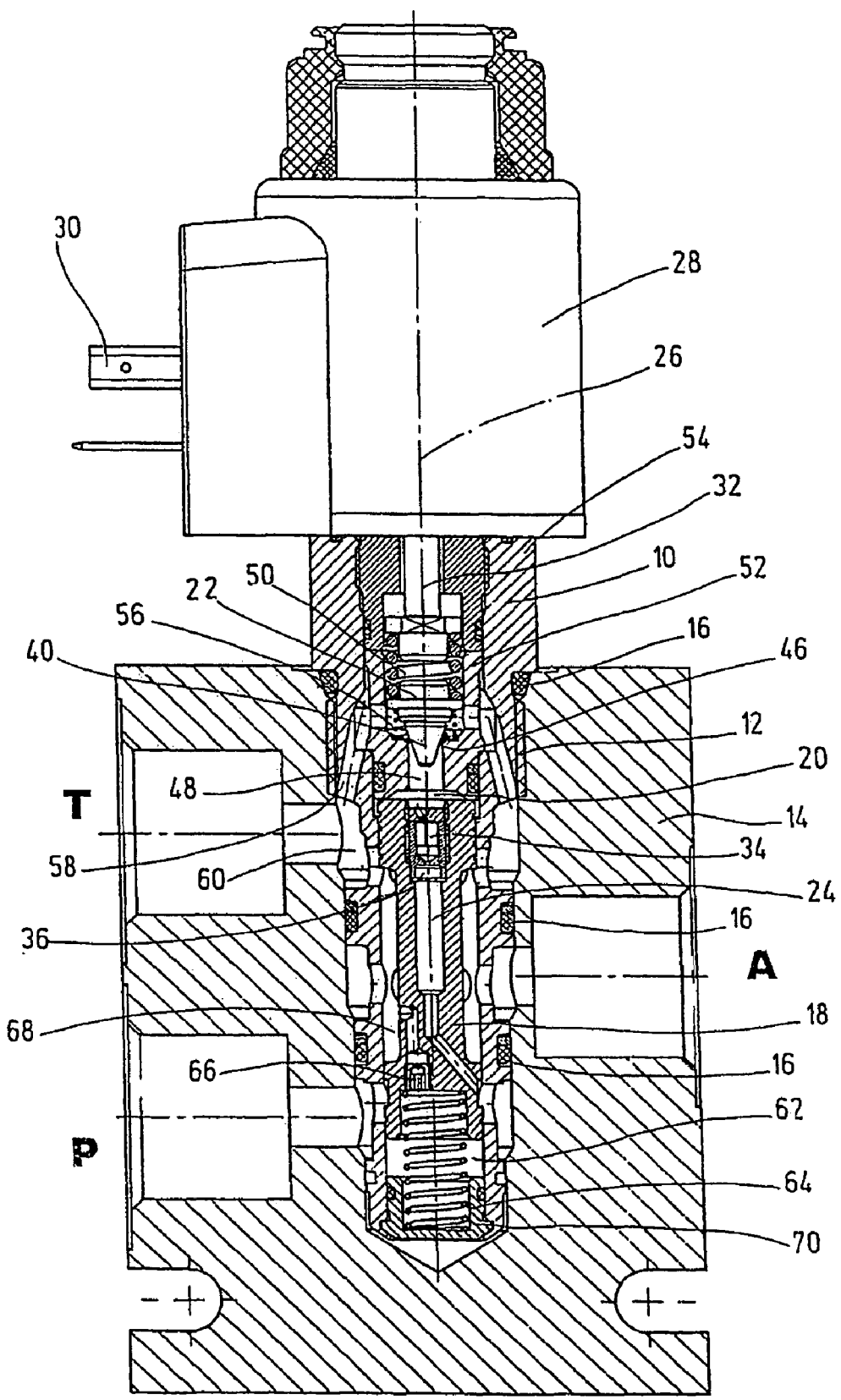
FIG. 1 is a diagrammatic, front elevational view in section of a proportional pressure control valve according to one embodiment of the present invention in the operating or actuating position, with the valve being connected as a screw-in cartridge received in a valve housing with the individual valve ports A, P and T.

The valve according to one embodiment of the present invention is in the form of a proportional pressure control valve shown in FIG. 1. The valve has a valve housing 10 configured as a screw-in cartridge that can be screwed into a machine part, for example, in the form of a valve block 14 or the like, by a screw-in or threaded segment 12. For this connection, the valve housing 10 is provided on the outer circumferential side with the corresponding washers or sealing rings 16, in addition to the pertinent receptacle for the sealing system. The valve housing 10 in the radial circumferential direction, and especially in the direction of FIG. 1, from top to bottom has a tank port T, a use port A and a pump port P for a hydraulic pump (not shown in detail). A control piston 18 is guided for movement in the longitudinal direction within the valve housing 10 for optionally connecting the pump port P to the use port A and the use port A to the tank port T.

To establish a fluid-carrying connection between the pump port P and the pilot chamber 20 of a pilot valve 22, the control piston 18 is provided with a connecting channel 24 which, in the longitudinal direction 26 of the entire valve, extends in the middle through the control piston 18. The connecting channel 24 on its lower end, as viewed in FIG. 1, is offset and extending in the transverse direction to the pump port P. The pilot valve 22 can be actuated by a magnetic system, in particular one in the form of a proportional magnetic system 28. This magnetic system 28 generally has a coil winding (not shown) which can be supplied with current, and a plug connector part 30 for this purpose. When current is supplied to the proportional magnetic system 28 by its plug connector part 30, an actuating plunger 32 is actuated by the coil winding (not detailed), such as that viewed in FIG. 1, the plunger has a downward direction of movement to keep the actual pilot valve 22 shown in FIG. 1 in its closed position. This structure of the magnetic system 28 in its mode of operation is known in the prior art so that it is not described in detail.

The connecting channel 24 has a throttle in the form of an orifice 34 (compare also the enlargement in FIG. 2) in the direction of the pilot chamber 20 of the pilot valve 22. This orifice 34 constitutes a local flow resistance with a usually sudden cross sectional constriction in which the ratio of the length of the orifice to its diameter is selected to be relatively small (for example, approximately 1.5). The narrowest flow cross section is generally outside of the geometrical cross sectional constriction. Since in these flow resistances the viscous fluid friction is very low, the volumetric flow is dependent on the pressure difference, and not on the viscosity of the fluid stream.

Figure 2:
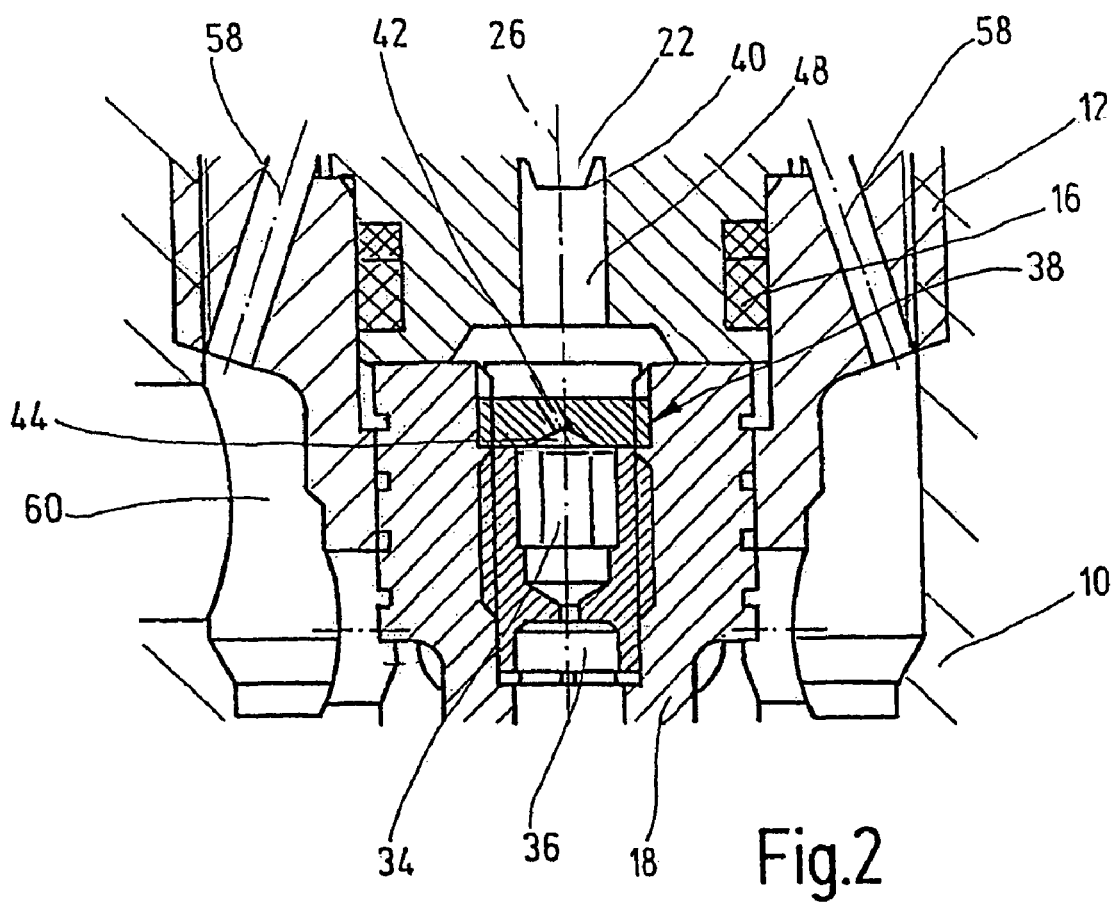
FIG. 2 is an enlarged, partial, front elevational view in section of the pilot chamber with a part of the valve part and the combination of the throttle designed as an orifice with a diffusor orifice and upstream filter part, which combination is connected upstream in the direction of the fluid stream, of the valve of FIG. 1.
Figure 3:
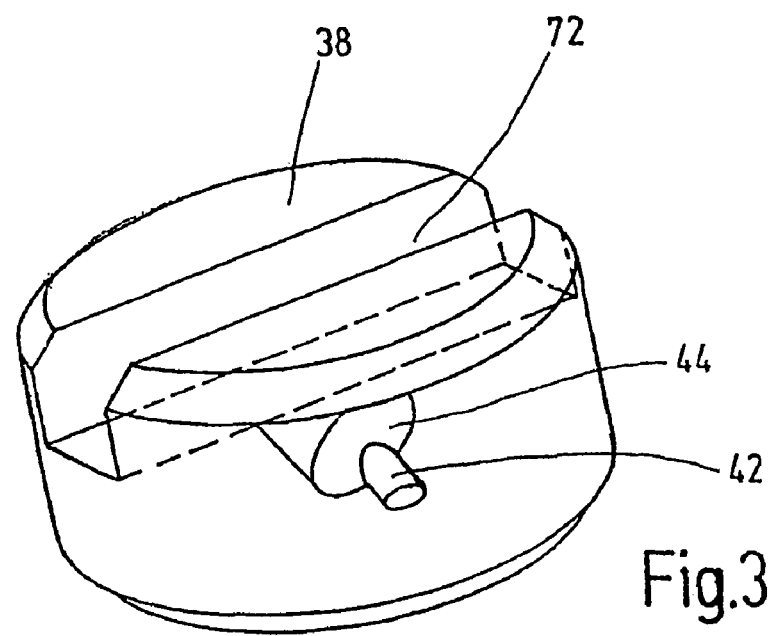
FIG. 3 is a perspective view of the diffusor orifice of FIG. 2 viewed from the underside.

The orifice 34 in the fluid flow direction is connected downstream from a filter part 36, for example, in the form of a protective screen, to filter contaminants out of the fluid flow and to protect the following orifice 34 against clogging by impurities. Following in the fluid stream direction to the orifice 34, a fluid guiding means or guide 38 (FIG. 2) is connected downstream. Guide 38 performs the function of deflecting the directed fluid stream flowing out of the orifice 34 in the direction of the pilot chamber 20, so that it does not directly strike the closing or valve part 40 of the pilot valve 22. In the prior art, this direct striking led to malfunctions in certain valve states. The guiding means 38 can be provided with atomizer nozzles ensuring that the added fluid flow is atomized in such a way that a uniform homogeneous distribution of the fluid in the pilot chamber 20 occurs. Possible jet forces on the valve part 40 are for the most part avoided by the unit or homogeneous distribution. In addition or as an alternative to the atomizer nozzles, the guiding means 38 can also be provided with a deflection part designed as a deflection channel 42, as illustrated in FIGS. 2 and 3, according to the exemplary embodiment shown. This deflection channel 42 is tilted or angled relative to the connecting channel 24 and the longitudinal alignment or axis 26 of the entire valve with a definable inclination, for example, with an angle between 10° to 30°. Fluid flow delivered by the connecting channel 24 travels as a helical guide or along a helical path into the pilot chamber 20 to be routed in a lateral path and guided radially around the tapering valve part 40. The fluid stream then comes into indirect contact with the valve part 40. The force of the fluid stream on the valve part can thus also be reduced in each of its operating positions. Advantageously, as shown in FIG. 3, in the fluid direction upstream from the inclined deflection channel 42, another throttle in the form of another orifice 44 is provided. In terms of flow engineering, orifice 44 is particularly beneficial when the proportional pressure control valve is to be used for high pump pressures (primary pressures). By replacing this component by a diffusor with a different orifice diameter, the valve can be adapted to different pump pressure ranges so that a plurality of requirement profiles can be accommodated with one valve design.

The pilot chamber 20 is part of a valve seat 46 mounted stationary in the valve housing 1. The valve seat 46 is connected by a center channel 48 as a fluid-carrying component of the pilot chamber 20 to the latter. This valve seat 46 can sealingly contact the valve part 40 of the pilot valve 20 as shown in FIG. 1. The valve part 40 can be moved into its closed position shown in FIG. 1, spring-loaded, in the direction of the pilot chamber 20. For contact with the actual valve seat 46, the valve part 40 on its front end which is the lower end when viewed in FIG. 1 is provided with a tapering closing or valve tip. The valve tip is in turn a one-piece component of a valve guide plate on which compression spring 50 is mounted on each of its two sides. A first compression spring 50 extends between the valve guide plate and a flange-like widening on the bottom end of the actuating plunger 32. The second compression spring 50, which is designed to be weaker in terms of its compression force than the first compression spring, extends with its two free ends on the valve guide plate and the top of the valve seat 46. For better guiding of the compression springs 50, the valve guide plate as is shown in FIG. 1 can be provided with a cylindrical guide or contact cap on both sides.

For guiding of the valve guide plate within the valve housing 10, a guide part 52 designed as a cylindrical sleeve is permanently connected to the valve housing 10. Between the guide part 52 and the actual magnetic system 28, a screw-in or threaded part 54 fixedly attaches the proportional magnetic system 28 to the valve housing 10. In the screw-in part 54, the actuating plunger 32 with its flange-like widening is guided on its one free end. The guide part 52 with the stationary valve seat 46 adjoins a distribution space 56 in the shape of an annular channel. A fluid-carrying path 58 extends in the valve housing 10, is permanently connected to this valve space 56, and discharges at its other free end into a connecting space 60 adjoining the outside circumference of the valve housing 10 and the inside circumference of the valve block 14 into which the valve housing 10 can be inserted and into which the tank port T in the valve block 14 discharges.

A connection between the tank port T and the distribution space 56 is obtained by the fluid-carrying path 58. The fluid-carrying path 58 can be configured as shown in FIG. 1 from a plurality of individual channels which extend conically in the direction of the actuating plunger 32 and extend through the valve housing 10, at the height of its screw-in segment 12. The respective end of the indicated individual channels oriented in the direction of the tank port T as viewed in FIG. 1 underneath the bottom end of the screw-in segment 12 exits to the outside or enters the connecting space 60. Based on this structural design of the pilot valve 22, as described in the foregoing, the pilot valve is accordingly designed as a proportional pressure relief valve.

As FIG. 1 shows, the control piston 18 with the valve housing 10 on its end facing away from the pilot chamber 20 adjoins a damping chamber 62. In this damping chamber 62, an energy storage device, especially in the form of a compression spring 64, which tries to move or biases the control piston 18 in the direction of the pilot chamber 20. The damping chamber 62 is connected by a damping orifice 66 located in the control piston 18 to an annulus 68 enclosing the control piston 18 and adjoining the inside of the valve housing 10 to the outside. Depending on the longitudinal or displacement position of the control piston 18 in the valve housing 10, this annulus 66 optionally connects the tank port T to the use port A or the use port A to the pump port P. The damping chamber 62 is enclosed by the inside of the valve housing 10, and on its one side adjoins the control piston 18. Its opposite side adjoins a lift stop 70 for the control piston 18. The actual lift stop 70 is formed by one free side which faces the control piston 18, and forms the termination of the valve housing 10 on its one side opposite the valve block 14.

The structural design of the proportional pressure control valve has now been described in its essential principles. For the sake of better understanding, the operating process will be described in greater detail below.

If the proportional magnetic system 28 remains without current supply, the hydraulic medium (oil) can flow from the pump port P to the tank port T. In this valve state, the pilot valve 22 consequently must be opened and the control piston 18 is moved onto its upper stop against the lower side of the valve seat 46. In this operating position, the oil flows from the pump port P through the control piston 18, that is, by the connecting channel 24, and through the combination of the filter part 36, orifice 34 and diffusor orifice including the orifice 44 and deflection channel 42, and from there by the opened proportional pressure relief valve or pilot valve 22 of the pilot control to the tank T. The forces of the second compression spring 50 in conjunction with the pump pressure by the center channel 44 are sufficient to raise the valve guide plate with the valve part 40 against the action of the first compression spring 50 located over it. By way of the center channel 48, the hydraulic medium then travels into the distribution space 56 and then by way of the fluid-carrying path 58 into the connecting space 60 coupled to the tank port T leading to the tank. This volumetric flow can be defined as the pilot oil flow or leakage.

When the proportional magnetic system 28 is supplied with current by upstream electronics (not shown), the closing or valve part 40 of the pilot valve 22 travels onto its seat edge of the valve seat 46 to interrupt the volumetric flow between the pump port P and the tank port T. The pilot chamber 20 then fills up with the hydraulic medium, and as a result of which the pressure into this chamber rises. This prevailing pressure acts on the top front side of the control piston 18 and moves it in the direction of the lower lift stop 70 against the compressing third compression spring 64. The pressure in the pilot chamber then corresponds to the adjusted pressure.

When the pressure in the damping chamber 62 is less than the pressure in the pilot chamber 20, the control piston assumes a position in which the consumer port A is connected to the pump port P. The pressure on the use port A is signaled by the damping orifice to the damping chamber 62 and there acts on the front side of the control piston 18 as a counterforce to the pressure level in the pilot chamber 20. When the pressure in the damping chamber 62 has reached the controlled pressure, the control piston 18 is moved so that the connection between the pump port P and the consumer port A is throttled. The control piston 18 shifts into a position in which the two force levels are in equilibrium with one another and in this way define an opening window between the pump port P and the use port A. Accordingly, a pressure is generated on the consumer port A which is directly related to the electrical control signal of the magnetic system 28. By adjusting the defined secondary pressure, a volume of oil is continuously pushed back and forth by the damping orifice 66 between the damping chamber 62 and the consumer port A, with the result that the control process is damped to prevent disruptive vibrations during this adjustment process.

In the present invention with the pilot valve 22 opened, the fluid-carrying path is routed in part in the valve housing between the connecting channel 24 and the tank port T and is connected at the same time to the consumer port A to carry fluid. A valve is then formed which can be completely relieved in this way such that when the electronic control signal on the magnetic system 28 is omitted, the pressure controlled by the control piston 18 on the consumer port A reliably assumes a pressure value of 0 bar. Since the present invention thus omits returning the control piston (main stage) with a tensioned compression spring to its end position corresponding to the known solutions, it is ensured that especially in an application for hydraulic clutches they can be completely relieved, so that the clutch or plate stacks which otherwise are engaging are reliably detached from one another and thus release the clutch connection.

In the de-energized state, oil can flow from the pump port P to the tank port T. In this valve state the pilot valve 22 is opened and the control piston 18 has moved to its upper stop as is shown in FIG. 1. In this state, the oil flows from the pump port P through the control piston 18 through the filter orifice combination with the downstream diffusor orifice 42, 44, by the opened proportional pressure relief valve of the pilot control to the tank T. This volumetric flow can be defined as a pilot oil flow or leakage. The diffusor orifice 42, 44, is used to atomize and deflect the directed oil jet which is flowing out of the orifice 34 such a distance that the jet forces generated by the fluid stream do not directly strike the closing element 40 of the pilot control. Thus, neutral dynamic effects on the pilot control are reliably prevented, as well as any resulting malfunctions in certain valve states.

By replacement of guide 38 with its channel 42 and orifice 44 by a diffusor or guide with a different orifice diameter (not shown), the valve can be optimally adapted to different pump pressure ranges (primary pressures). A valve housing and the basically identical valve structure for a plurality of applications can then be accommodated. As shown by FIG. 3, the fluid guiding means or guide 38 is penetrated on its bottom by a transversely extending guide slot 72. Slot 72 is used for engagement of a screwdriver (not shown) to fix the fluid guiding means 38 within a screw-in segment in the control piston. The installation of the otherwise cylindrical component into the control piston 18 is greatly simplified. With the damping orifice 66 an adaptation to different applications is possible by the choice of the orifice diameter.

While one embodiment has been chosen to illustrate the invention, it will be understood by those skilled in the art that various changes and modifications can be made therein without departing from the scope of the invention as defined in the appended claims.

What is claimed is:

1. A valve, comprising:
   a valve housing including a pump port, a use port and a tank port;
   a control piston guided for longitudinal movement within said valve housing for selective fluid connection of said pump port to said use port and of said use port to said tank port, said control piston having a connecting channel;
   a pilot valve in said valve housing having a pilot chamber and a pilot valve part guided for longitudinal movement in said pilot chamber, said connecting channel connecting at least one of said ports with said pilot chamber in fluid communication;
   a first throttle in said connecting channel in a direction of and upstream of said pilot chamber; and
   a guide in said connecting channel in a direction of and upstream of said pilot chamber, said guide having at least one deflection channel extending obliquely to said connecting channel to deflect fluid flowing through said connecting channel and said guide away from said pilot valve part.

2. A valve according to claim 1 wherein
   said first throttle comprises an orifice; and
   said guide comprises an atomizer.

3. A valve according to claim 1 wherein
   said first throttle comprises an orifice; and
   said guide comprises first and second components separately fixed in said connecting channel.

4. A valve according to claim 1 wherein
   said first throttle comprises an orifice, and a filter part for a fluid stream on a side of said first throttle opposite said guide.

5. A valve according to claim 2 wherein
   at least one of said atomizer and said deflection channel having a second throttle having an orifice.

6. A valve according to claim 1 wherein
   said pilot valve is coupled to and actuated by a magnetic system.

7. A valve according to claim 6 wherein
   said magnetic system comprises a proportional magnetic system.

8. A valve according to claim 1 wherein
   a valve seat is mounted stationary in said valve housing, and is connected in fluid communication with said pilot chamber; and
   said pilot valve part is movable into and spring biased toward sealing contact with said valve seat.

9. A valve according to claim 1 wherein
   said pump port, said use port and said tank port extend through said valve housing in radial directions thereof.

10. A valve according to claim 1 wherein
    the valve is a proportional pressure control valve.

11. A valve according to claim 1 wherein
    said deflection channel extends at an angle from adjacent a longitudinal axis of said control piston radially outwardly away from and axially toward said pilot valve part.

* * * * *